United States Patent
Rabe et al.

[11] Patent Number: 6,035,211
[45] Date of Patent: Mar. 7, 2000

[54] DUAL USE SPEAKER FOR BOTH VOICE COMMUNICATION AND SIGNALLING

[75] Inventors: Karl W. Rabe, Chapel Hill; Trampas Stern, Raleigh, both of N.C.

[73] Assignee: Ericsson Inc., Research Triangle Park, N.C.

[21] Appl. No.: 08/770,706

[22] Filed: Dec. 19, 1996

[51] Int. Cl.[7] .................................................. H04B 1/38
[52] U.S. Cl. ........................ 455/550; 455/90; 455/575; 379/420; 379/433
[58] Field of Search ..................... 455/550, 575, 455/90, 567, 351, 569; 379/420, 433

[56] References Cited

U.S. PATENT DOCUMENTS

| | | | |
|---|---|---|---|
| 4,845,772 | 7/1989 | Metroka et al. | 455/90 |
| 5,224,151 | 6/1993 | Bowen et al. | 379/420 |
| 5,276,916 | 1/1994 | Pawlish et al. | 379/433 |
| 5,369,701 | 11/1994 | McAteer et al. | 379/420 |
| 5,493,690 | 2/1996 | Shimazaki | 455/575 |
| 5,537,472 | 7/1996 | Estevez-Alcolado et al. | 379/433 |
| 5,542,105 | 7/1996 | Finch et al. | 455/90 |
| 5,655,017 | 8/1997 | Fishman | 379/420 |
| 5,729,604 | 3/1998 | Van Schyndel | 379/420 |

FOREIGN PATENT DOCUMENTS

| | | |
|---|---|---|
| 0 440 473 | 8/1991 | European Pat. Off. |
| 2 698 749 | 6/1994 | France . |
| 2 135 841 | 9/1984 | United Kingdom . |
| WO 93/07680 | 4/1993 | WIPO . |

*Primary Examiner*—Dwayne D. Bost
*Assistant Examiner*—Quochien B. Vuong
*Attorney, Agent, or Firm*—Nixon & Vanderhye P.C.

[57] ABSTRACT

Disclosed is a method and apparatus for automatically limiting the amplitude output of a speaker for a mobile telephone when the telephone is in the active mode of operation. In a preferred embodiment, a tuned cavity in the stand-by mode operates in conjunction with the speaker to provide a higher than normal acoustic output. When the tuned cavity is moved away from the speaker, the acoustic output returns to the level equal to the speaker's normal output. In an electronic embodiment, a device switching the mobile telephone from the stand-by mode to the active mode also enables an amplitude limiter which limits the maximum acoustic output of the speaker to a level sufficient to prevent hearing discomfort or damage.

3 Claims, 1 Drawing Sheet

DUAL USE SPEAKER FOR BOTH VOICE COMMUNICATION AND SIGNALLING

BACKGROUND OF THE INVENTION

1. Field of the Invention

The present invention generally relates to mobile telephones such as cordless and cellular phones and specifically to those mobile telephones utilizing a speaker to convert electronic signals into acoustic signals.

2. Description of the Prior Art

Mobile telephones generally utilize a speaker to convert electronic signals representing verbal communication into acoustic communication signals as in a conventional telephone. Cordless and cellular phones generally have a "standby" mode (when the phone is not currently being used but when a call can be received) and an "active" mode of operation (when the phone is being used to generate a call or when a call has been answered). In many mobile telephones, a separate buzzer is utilized to generate a "ring" signal to indicate an incoming call to the operator when the phone is in the "standby" mode of operation (the equivalent of a conventional telephone when the receiver is on the cradle).

In order to be properly heard, the amplitude output of the buzzer in a mobile telephone has to be over 100 dBSPL at 1 cm distance. This sound level of signalling the ringing of the telephone would be very obnoxious in the event that the telephone were to ring when a user placed the phone to his or her ear.

Accordingly, prior art mobile phones utilized a separate buzzer and speaker. This also permitted the buzzer to be located near the end of the mobile telephone which conveniently would extend in an upward direction so that the buzzer could be easily heard during a "ring."

During the standby mode, the telephone operates only as a receiver and generates an appropriate "ring" signal when the base transmitter transmits the appropriate signal to the mobile telephone. The operational mode of the mobile telephone can be changed from "stand-by" to "active" by the operator keying a particular switch or opening the "flip" portion of the phone. Once changed to the active mode, the telephone will still ring but can also be used to generate a call (dial out) or to "answer" and converse with a party who has called in to the telephone.

It is desirable to reduce the costs of manufacturing such mobile telephones by reducing the number of parts and, if possible, reducing the area of required printed circuit boards by eliminating the buzzer and its associated circuitry. It has been proposed to use the loudspeaker as the generator of the acoustic "ring" signal. However, utilization of the speaker causes some difficulties in that, if the "ringing" signal generated by the speaker is sufficiently loud to signal the consumer that the phone is "ringing," this acoustic signal could also create discomfort and/or hearing damage in the operator of the mobile telephone if the phone "rang" when the operator has the phone in use, i.e., next to the operator's ear.

It is also desirable to eliminate the holes in the cover of a mobile telephone where such holes normally were in conjunction with the buzzer location to provide the maximums put during the "ringing" of the telephone. Unfortunately, the use of such holes provides an additional opening in the mobile telephone permitting impurities, dirt, water, etc. to enter the mobile telephone.

SUMMARY OF THE INVENTION

In accordance with the above discussion, it is an object of the present invention to eliminate the need for a separate buzzer to be utilized to generate a "ring" signal in a mobile telephone.

It is a further object of the present invention to utilize the existing loudspeaker to generate an appropriate "ring" signal in a mobile telephone.

It is a further object of the present invention to prevent hearing discomfort and/or damage resulting from a "ring" signal being generated by the loudspeaker when the speaker is in the operable position next to the operator's ear.

The above and other objects are achieved by a mobile telephone design which includes an automatic ringing volume limiter when the telephone is in the "active" mode. This object is achievable in several different fashions in accordance with the present invention. In one embodiment, the telephone includes a "flip" which covers the speaker area of the telephone when not being used and the flip includes a channel or cavity which serves to amplify the loudness of the "ring" signal when the flip is in the closed position (the stand-by mode). When the flip is moved to the opened position, bringing the mobile phone to the active mode, the cavity in the flip is removed from proximity with the speaker eliminating the amplification of the "ring" signal from the speaker.

In another embodiment, an electronic ring volume limiter is enabled when the flip is opened or, in a non-flip telephone, when a switch activated (to change from the standby mode to the active mode). Thus, a signal with at least the specific frequency of the "ring" signal is limited to an amplitude insufficient to cause discomfort or damage to the operator's ear.

BRIEF DESCRIPTION OF THE DRAWINGS

The above, as well as other advantages and features of this invention, will be more completely understood and appreciated by review of presently preferred exemplary embodiments taken in conjunction with the accompanying drawings, of which.

DETAILED DESCRIPTION OF PREFERRED EMBODIMENTS

In discussion of the preferred embodiments illustrated in the accompanying drawings, similar numbering will be used for similar structures among these several views.

Figure 1:
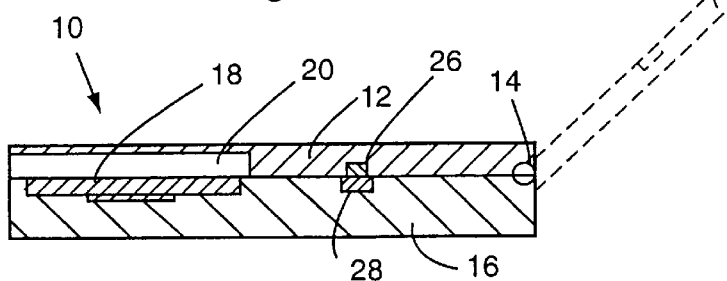
FIG. 1 is a side view partially in section of a mobile telephone in accordance with the present invention.
Figure 2:
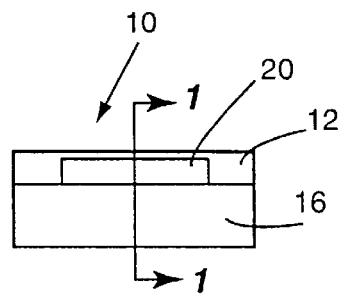
FIG. 2 is an end view of the mobile telephone illustrated in FIG. 1.

In FIG. 1, the method and apparatus according to the present invention is disclosed and includes a mobile telephone 10 having a "flip" portion 12 which includes a hinge 14. The flip is movable between a closed position (standby mode) as illustrated in solid lines and an open position (active mode) as illustrated in phantom lines. The body 16 of the mobile telephone includes a speaker 18 which generates conventional acoustic signals for voice communication and also generates an acoustic "ring" signal. The utilization of the loudspeaker 18 for both voice communication and the "ring" signal obviates the need for a separate buzzer and the associated buzzer control circuitry as in conventional mobile telephones.

In a preferred embodiment, the sound of the phone ringing is directed out of the top of the phone. The lower acoustic output of the loudspeaker is amplified by the use of a tuned cavity 20 which is located adjacent the loudspeaker 18. Tuned cavity 20 can be either a helmholtz resonator, a quarter wavelength stub, horn loading, or other tuned resonating device (or combinations of these) which serves to amplify the volume level of the ring signal from the loudspeaker. While the volume of the acoustic signal provided by the loudspeaker 18 is amplified to enable the operator to clearly appreciate when the phone is "ringing" (when the flip 12 is in the closed position or standby mode), the volume is not amplified when the mobile telephone is in use (when the flip 12 is in the open position or active mode).

It can be seen from FIG. 1 that when the flip 12 is in the open position or the active mode, the tuned cavity is not located adjacent speaker 18 and therefore there is no amplification of the speaker output. Accordingly, if the phone has been placed in the active mode (perhaps prior to actually placing a call), an incoming call is received, the volume of the "ring" will be at the safe lower acoustic level than if amplified with the flip 12 is in the closed position. This feature then permits the use of speaker 18 to accomplish both the voice communications and the "ringing" function but at the same time prevents discomfort and/or damage to the operator's hearing.

Figure 3:
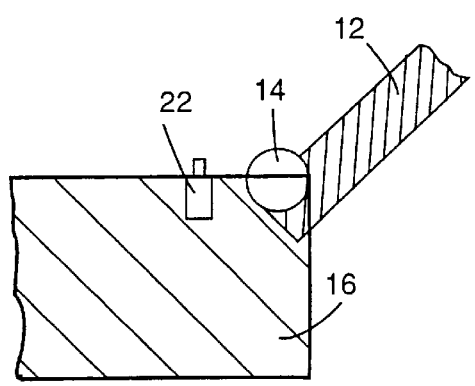
FIG. 3 is a partial side view partially in section of the mobile phone shown in FIG. 1.
Figure 4:
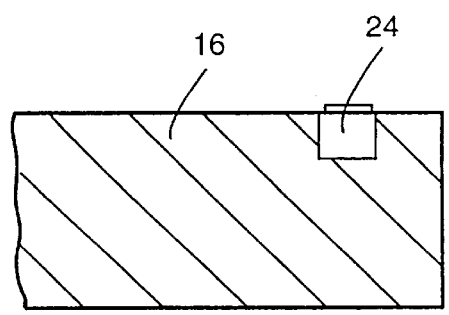
FIG. 4 is a partial side view of a further mobile telephone in accordance with the present invention.

FIG. 3 illustrates the use of a switch which in a preferred embodiment signals that the flip 12 is in the closed position to automatically change the mobile telephone from the active mode (when the flip is in the open position) to the stand-by mode (when the flip is in the closed position) and vice versa. A similar operator controlled mode switch 24 is shown in FIG. 4. As shown in FIG. 1, in one embodiment of the present invention, a magnet 26 is located in the flip 12 and the proximity of the magnet is sensed by hall effect or equivalent reed switch 28. Thus, the output of switch 28 can be used to change the operating mode of the mobile telephone from standby to active and vice versa. An additional use for the flip controlled mode switch 22, hall effect/reed switch 28 or the operator controlled mode switch 24 will now be discussed.

There may be circumstances under which the volume amplification of the acoustical output of the mobile telephone during a "ring" is not sufficient when the tuned cavity 20 is located adjacent speaker 18. In such cases of a flip phone or in potentially all cases of a non-flip phone, it may be necessary to drive the loudspeaker with a higher power signal which will be above some desired maximum level and then actually limit the maximum amplitude of any acoustic signal generated by the loudspeaker when the mobile telephone is in the active mode.

Figure 5:
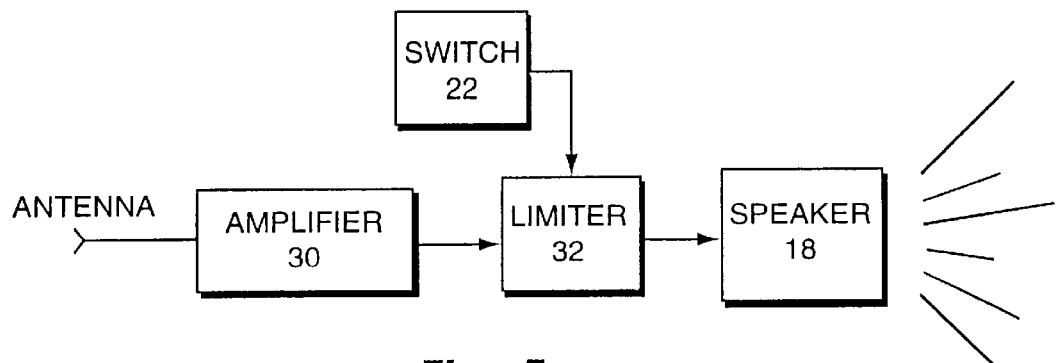
FIG. 5 is an electronic block diagram of one embodiment of the present invention.

FIG. 5 illustrates as a simple block diagram the manner in which switch 22, switch 24 or switch 28 could serve to control a volume limiter in a mobile telephone circuit. The incoming signal, whether a voice communication or a "ring" signal, is received by the antenna and provided to amplifier 30 which decodes and amplifies the received signal which would normally be applied directly to speaker 18. However, in this preferred embodiment, an amplitude limiter 32 is interposed between amplifier 30 and speaker 18 and serves to limit the maximum amplitude of any signal applied to speaker 18 when the limiter is enabled by switch 22. The actual circuitry of the amplifier 30 and the amplitude limiter 32 would be obvious to those of ordinary skill in the art in view of this disclosure and is not included for the purpose of clarity.

Of course, switch 22 can also be used to signal the amplifier to change from standby to active mode as it would in a preferred embodiment but this is not a requirement of the amplitude limiting feature. Additionally, switch 24 could be substituted for switch 22 or switch 28 in a non-flip embodiment and, in such embodiment, could also be utilized to change the mode from standby to active as previously discussed.

In view of the above disclosure, one of ordinary skill in the art will be aware of many modifications and changes to specific applications which will utilize the present invention to varying degrees of benefit. It has already been noted that flip operated switches whether in the form of a microswitch 22 or a hall effect switch 28 or non-flip operated switches such as manual switch 24 can be utilized not only to change the operating mode of the mobile telephone but also to enable an amplitude limiter so as to prevent the loudspeaker 18 from providing an output greater than a predetermined level.

It will also be apparent that there are numerous acoustical configurations depending upon the loudspeaker 18 and the tuned cavity 20 located in flip 12 which will amplify the output of the loudspeaker when the cavity and loudspeaker are in close contact and yet will not amplify the loudspeaker acoustical output when they are separated. Thus, the present invention includes both mechanical and electrical concepts for limiting the volume of a mobile telephone "ring" when in the "active" mode.

Accordingly, the present invention is limited only by the claims appended hereto and, in the broadest sense, is not limited to the specific examples included in this application.

What is claimed is:

1. A mobile phone including a mobile phone ringing system with an automatic volume limiter, said mobile phone operable in active and standby modes where said active mode permits communicating over the mobile phone and said standby mode permits ringing of the mobile phone, said mobile phone including a loudspeaker for converting electrical signals received by said mobile phone into acoustic signals, where a mobile phone operator determines the mode of operation, said mobile phone including a flip controllable by said mobile phone operator and moveable between open and closed positions, said open position corresponding to said active mode and said closed position corresponding to said standby mode, said automatic volume limiter comprising:

means for sensing the mode of said mobile phone;

means, responsive to said sensed mode of said mobile phone being in an active mode, for limiting the volume provided by said loudspeaker to a predetermined level and, responsive to said sensed mode of said mobile phone being in a standby mode, for not limiting the volume of the loudspeaker to the predetermined level, wherein said mobile phone includes at least one mechanical amplifier comprising a tuned cavity, said mechanical amplifier associated with said loudspeaker, where, in said closed position, said mechanical amplifier is adjacent said loudspeaker and amplifies an acoustic signal from said loudspeaker, and, in said open position, is away from said loudspeaker and does not amplify any acoustic signal from said loudspeaker.

2. The mobile phone according to claim 1, wherein said flip comprises at least a portion of said mechanical amplifier, and said mechanical amplifier is disrupted when said flip is in said open position.

3. A method of limiting the volume of a loudspeaker in a mobile phone having a mobile phone ringing system, where said mobile phone is operable in active and standby modes, where said active mode permits communicating over the mobile phone and said standby mode permits ringing of the mobile phone, said mobile phone including a loudspeaker for converting electrical signals received by said mobile phone into acoustic signals, where a mobile phone operator determines the mode of operation, said method comprising the steps of:

sensing the mode of said mobile phone;

limiting, in response to said sensed mode of said mobile phone being in an active mode, the volume provided by said loudspeaker to a predetermined level, wherein said mobile phone includes a flip moveable between a closed position and an open position, said closed position comprising a standby mode and said open position comprising an active mode for said mobile phone, said loudspeaker limited to providing an output amplitude insufficiently large to harm the hearing of said mobile phone operator, said limiting step including:

providing said flip with a tuned cavity amplifier, locating said tuned cavity amplifier adjacent said loudspeaker when said flip is in said closed position and away from said loudspeaker when said flip is in said open position, said tuned cavity amplifier amplifying said loudspeaker output amplitude so as to be sufficiently large as to cause damage to hearing of said operator.

* * * * *